G. C. W. GOSS.
TOOL HOLDER.
APPLICATION FILED FEB. 13, 1918.
1,290,542.
Patented Jan. 7, 1919.
2 SHEETS—SHEET 1.
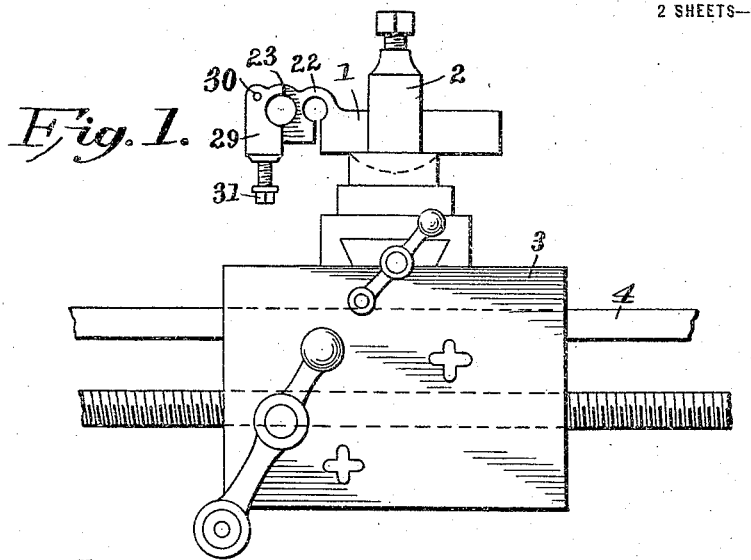
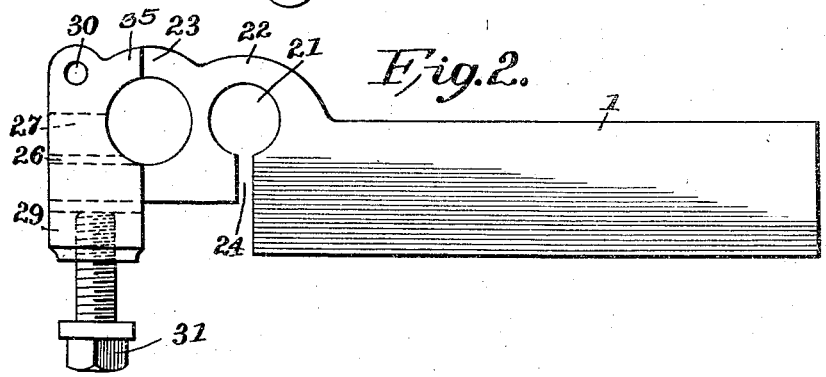
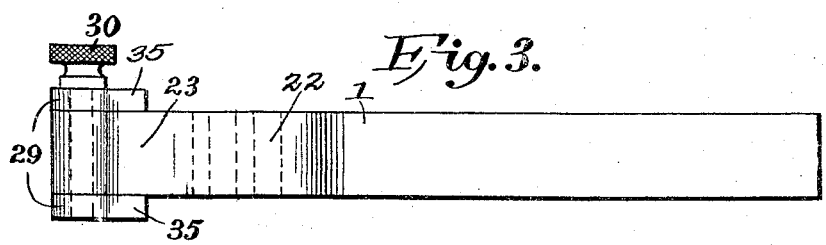
Inventor.
George C. W. Goss,
By Frederick V. Winters
Attorney.

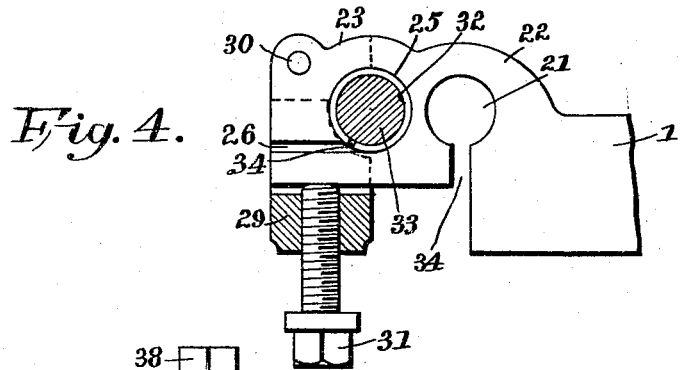
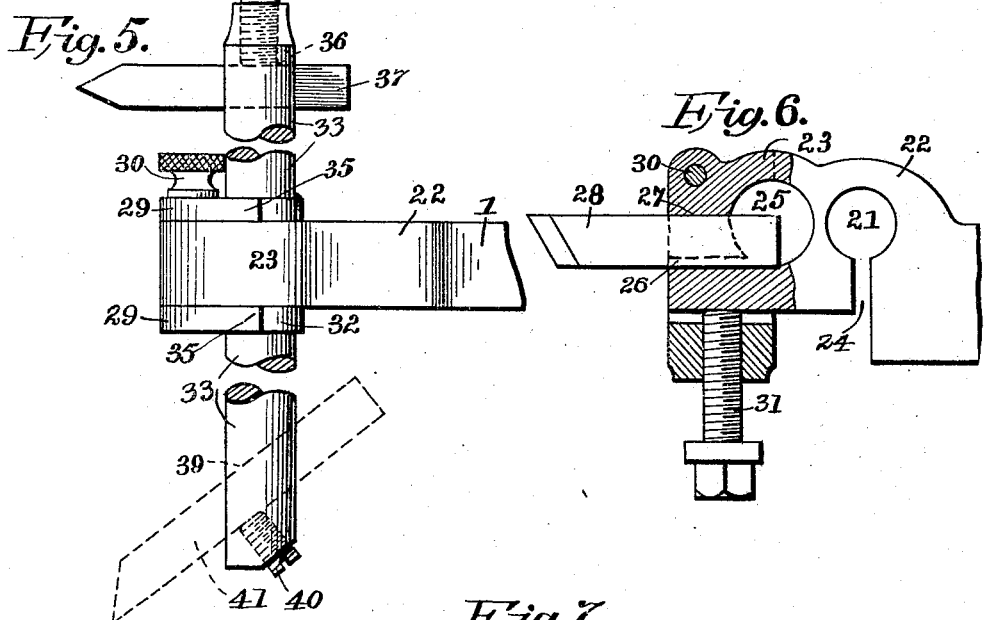
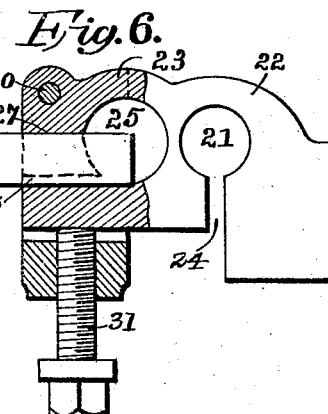
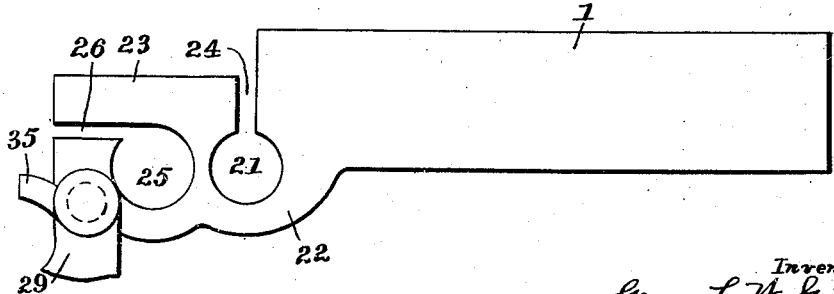

UNITED STATES PATENT OFFICE.

GEORGE C. W. GOSS, OF WEST ENGLEWOOD, NEW JERSEY.

TOOL-HOLDER.

1,290,542.  Specification of Letters Patent.  Patented Jan. 7, 1919.

Application filed February 13, 1918. Serial No. 216,902.

*To all whom it may concern:*

Be it known that I, GEORGE C. W. GOSS, a citizen of the United States, residing at West Englewood, in the county of Hudson and State of New Jersey, have invented certain new and useful Improvements in Tool-Holders, of which the following is a full, clear, and exact specification.

This invention relates to tool holders for lathes, boring machines, etc.

It is the aim of this invention to provide a universal tool holder adapted to support various tools for a variety of purposes, whereby one holder of this kind will meet the requirements heretofore necessitating the keeping on hand of several different tool holders. A special object is to provide a tool holder capable of supporting a thread cutting tool so as to give it a resilient or yielding action, which is an important advantage in cutting either external or internal threads. Other objects will apppear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is an elevation of a lathe carriage and turret showing the holder in position in the turret.

Fig. 2 is a detailed view of the holder alone.

Fig. 3 is a plan view of the same.

Fig. 4 is a broken detailed view of the tool supporting end of the holder with a transverse tool holding bar mounted thereon.

Fig. 5 is a broken plan view of the same.

Fig. 6 is a view similar to Fig. 4 except that instead of the transverse tool holding bar a tool is mounted directly on the holder and Fig. 7 is a side view of the holder reversed.

It will be understood that the universal tool holder constituting this invention is designed to have its shank 1 clamped in the turret 2 on the carriage 3 of a lathe or boring machine 4, and that the holder is equipped with means for clamping various kinds of tools thereto in different positions to accomplish the several kinds of work required. The shank is generally rectangular in cross section to fit the turret, and is equipped at one end with means for supporting external and internal thread cutting tools in such a manner as to give them a spring action.

One end of the shank 1 of the tool is partly severed at 21 leaving a thin resilient connecting arm 22 between said shank and the extreme end portion 23. The wide circular opening 21 has a narrow slot 24 leading thereto, whereby the bending of the resilient connecting arm is limited and its breaking off prevented.

The resilient end portion 23 has a round opening 25 therethrough from which a longitudinal slot 26 extends to the end of the holder. A yoke 29 is swiveled by the pin 30 to said end portion 23 at one side of the slot 26 and is adapted to embrace the other side thereof, and a clamping bolt 31 carried by said yoke is adapted to draw said sides toward each other so as to decrease the diameter of the opening 25. In one face of the slot 26 a tool holding groove 27 is formed, and an external thread cutting tool 28, Fig. 6, may be clamped therein by the yoke 29 and bolt 31.

When internal threads are to be cut, a transverse bar 33 is clamped in the opening 25, Figs. 4 and 5, a reducing sleeve 32 being preferably placed around said bar and protruding to either side of the holder. Said reducing sleeve 32 is split at 34 to permit it to be contracted for clamping about the bar 33. The yoke 29 has wings 35 to engage the protruding ends of the reducing sleeve 32 when the latter is in the opening 25, for preventing said yoke from swinging out of its proper clamping position.

The bar 33 may be of any desired length, and is provided with a right angular passage 36 at one end to receive an internal thread cutting tool 37 which is clamped therein by a set screw 38. The other end of the bar 33 has an inclined or oblique passage 39 therein to hold an oblique tool 41 clamped in place by a set screw 40.

Having thus described my invention, what I claim as new and desire to secure by Letters Patent of the United States is:—

1. A tool holder having a resilient end portion provided with a transverse passage and a slot leading from said passage to the end of the holder, a tool-holding bar adapted to be arranged in said transverse passage, and a yoke pivoted to the holder at one side of said slot and adapted to embrace the end portion of the holder at the other side of said slot for clamping said bar in place.

2. A tool holder having a transverse passage and a slot leading from said passage to the end of the holder, a split reducing sleeve adapted to fit said passage, a tool-holding bar to fit in said sleeve, and means for drawing together the end portions of the holder at opposite sides of said slot for contracting the sleeve and clamping the bar therein.

3. A tool holder having a transverse passage and a slot leading from said passage to the end of the holder, a split reducing sleeve to fit in said passage and protrude therefrom at opposite sides of the holder, a tool-holding bar to fit in said sleeve, and a yoke swiveled to the end portion of the holder at one side of said slot and adapted to embrace the end portion at the other side of said slot for contracting the sleeve and clamping the bar therein, said yoke having lugs to engage the protruding ends of the sleeve for the purpose specified.

In testimony whereof I have signed my name to this specification.

GEORGE C. W. GOSS.

Copies of this patent may be obtained for five cents each, by addressing the "Commissioner of Patents, Washington, D. C."